United States Patent [19]

Johnson et al.

[11] 4,100,404
[45] Jul. 11, 1978

[54] BEAM PROJECTOR

[75] Inventors: Philip M. Johnson, Windham, N.H.;
John D. Kuppenheimer, Jr., Tewksbury, Mass.

[73] Assignee: Sanders Associates, Inc., Nashau, N.H.

[21] Appl. No.: 704,894

[22] Filed: Jul. 13, 1976

[51] Int. Cl.² .............................................. H04B 9/00
[52] U.S. Cl. ........................................ 250/199; 350/184; 356/8
[58] Field of Search ................ 250/199; 350/87, 184, 350/186, 187, 235, 236, 237; 356/152, 4, 8; 353/102

[56] References Cited

U.S. PATENT DOCUMENTS

| 2,078,586 | 4/1937 | Richter | 350/87 |
| 3,662,180 | 5/1972 | Jorgensen et al. | 250/199 |
| 3,704,070 | 11/1972 | Johnson et al. | 250/199 |

*Primary Examiner*—Richard Murray
*Attorney, Agent, or Firm*—Louis Etlinger; Richard I. Seligman

[57] ABSTRACT

A beam projector is provided by a plurality of coded reticles mounted on a spinning disc and illuminated by a laser source. In order to maintain a constant irradiance on a receiver variably located in space a pseudo-zoom assembly is provided including a moveable source and/or condenser optics. Also, plural focal length optics are employed to expand the range over which the constant irradiance is maintained beyond that realizable by the pseudo-zoom assembly itself.

33 Claims, 6 Drawing Figures

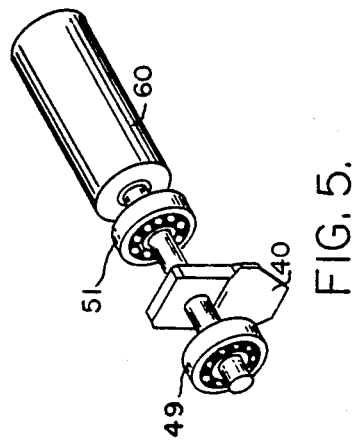
FIG. 3.
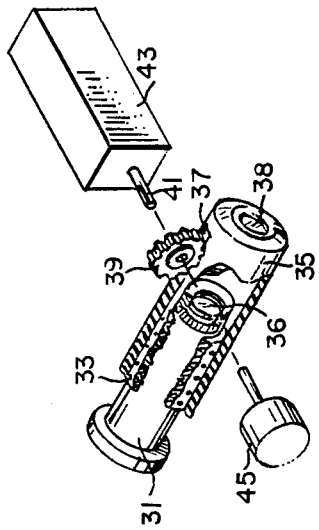
FIG. 4.
FIG. 5.
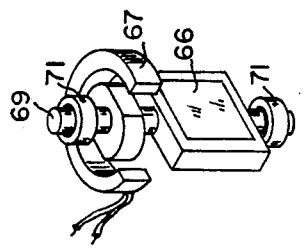
FIG. 6.
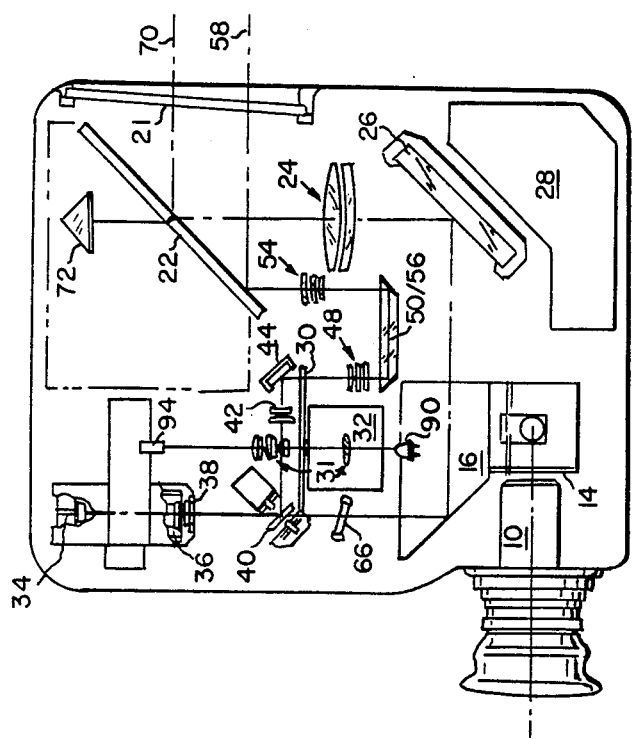
FIG. 1.

BEAM PROJECTOR

BACKGROUND OF THE INVENTION

Currently optically guided missiles are guided by electrical control signals supplied via a wire which is coupled between the launcher and the missile during its flight. Because of obvious deficiencies in this type of guidance system, it is desirable to provide guidance for an optically guided missile having no physical connection between the launcher and missile during flight. Conventional terminal homing missiles are inadequate for this purpose because of their relatively high cost and complexity.

Beam guided missiles reduce such complexity. Typical beam guided techniques nutate the images of multiple lasers and project them through a zoom lens. To encode space in this manner is very inefficient in that it requires an excessive amount of laser pulses for each receiver position sample.

Also the use of zoom lenses is to be avoided if at all possible since the multi-element zoom lenses will be subjected to shock and vibration necessitating that highly complex and costly system modifications be employed to correct boresight changes in the critical imaging portion of the beam projector.

SUMMARY OF THE INVENTION

Accordingly, it is an object of this invention to provide an improved beam projector.

It is another object of this invention to provide a beam projector having a capability of projecting a substantially constant diameter beam at a receiver the range of which varies with respect to the projector.

It is a further object of this invention to provide a pseudo-zoom lens for a projector.

It is yet another object of this invention to provide a projector having multiple fixed focal lengths of projector optics.

Briefly, a projector is provided which emits a spatially encoded guidance beam along a line of sight between a missile gunner and a target. The missile carries sensors which detect the angular deviation thereof from the line of sight between the gunner and target and corrections are made to the flight path of the missile in accordance with the detected angular deviation.

The spatially encoded guidance beam is produced by a laser-illuminated slide projector, in which there are a plurality of coded reticles or "slides" mounted on a spinning code disc. The spinning disc has position references so that a laser is pulsed each time a reticle pattern is properly located on the projection lens optical axis. A sequence of different patterns is projected into the same space for each revolution of the code disc. The receiver on the missile will receive a sequence of laser flashes that is different for each of a number of positions in space.

In order to keep the cost and complexity of the missile receiver relatively low, to provide for initial capture of the missile and to avoid early warning of the target a feature of the projector is a means to maintain the beam diameter and the irradiance at the missile substantially constant despite the fact that the distance between the projector and missile keeps changing. If the irradiance at the missile is held relatively constant the dynamic range of the missile receiver can be maintained relatively small and therefore it is less costly and simpler.

Conventionally, maintenance of a constant beam diameter would be accomplished using a zoom projection lens; however, even slight misalignment in a projection lens can cause beam boresight to shift. For projectors mounted on tanks or the like which undergo substantial shock and vibration such misalignment would occur. In addition, a zoom lens of required zoom ratio which is 25:1 as a minimum, contains a large number of elements and is prohibitively expensive.

This is avoided by the provision of a pseudo-zoom lens feature wherein movement of the condensing optics accomplishes the zoom feature. Furthermore, in order to achieve constant beam diameter over a larger range than is possible with only the moveable condensing optics, switching is provided between two different focal lengths of projection optics.

BRIEF DESCRIPTION OF THE DRAWINGS

The above-mentioned and other features and objects of this invention will become more apparent by reference to the following description taken in conjunction with the accompanying drawings, in which:

FIG. 1 is a plan view of the optical system of a beam projector;

FIG. 3 is a perspective view of the code disc drive motor assembly of the projector of FIGS. 1 and 2;

FIG. 4 is a perspective view of the pseudo-zoom lens assembly of the projector of FIGS. 1 and 2;

FIG. 5 is a perspective view of the switched mirror assembly of the projector of FIGS. 1 and 2; and FIG. 6 is a perspective view of the tilt plate assembly of the projector of FIGS. 1 and 2.

DESCRIPTION OF PREFERRED EMBODIMENTS

Figure 2:
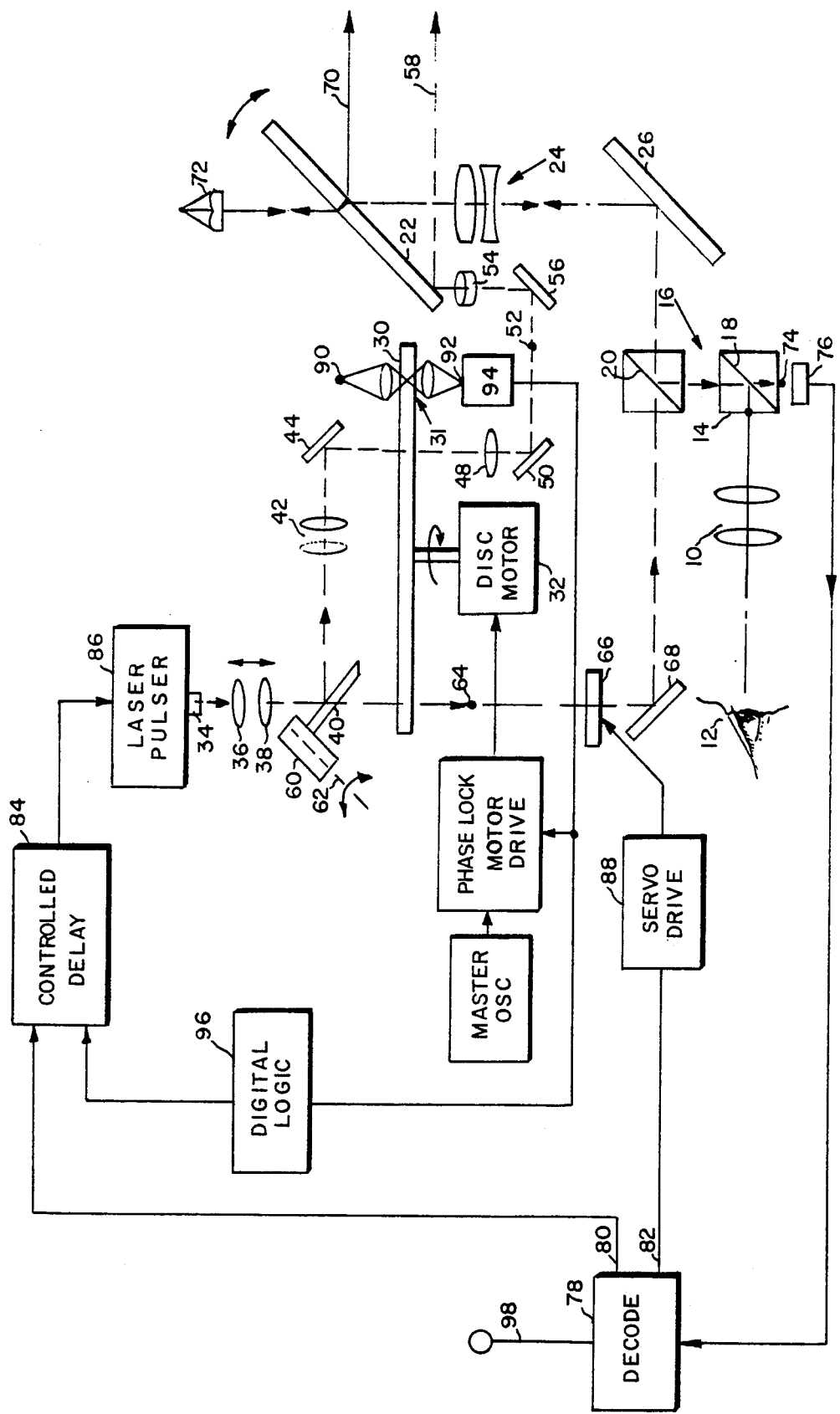
FIG. 2 is a block diagram of the projector of FIG. 1.

Referring now to FIG. 1 of the drawings there is illustrated thereby an embodiment of the optical system of a laser beam rider projector which is also schematically illustrated in FIG. 2. The laser beamrider projector includes an eye piece 10 which is used by a missile gunner 12 to position a set of cross hairs on a target. The cross hairs are disposed on a cross hair or aiming rectile 14 arranged on one surface of a prism assembly 16. Prism 16 may be a modified Porro-Abbe prism or other conventional reverting and inverting prism system in order to provide the gunner with a properly oriented image while using the same lens system for projection and viewing. Alternatively, separate viewing and projection optics may be provided. Cross hair reticle 14 is preferably etched on one surface of the prism 16, or alternatively, may be disposed on a glass element and cemented or otherwise affixed to prism 16. The prism 16 includes within the body thereof a pair of dichroic beam splitters 18 and 20. The missile gunner 12 sees the cross hairs from the cross hair reticle 14 in focus on the target.

The target image enters the projector through an output window 21 and is reflected off a mirror 22. It then passes through an objective lens 24. The image passing objective lens 24 is reflected by a mirror 26, and in turn reflected from the dichroic beam splitters 20 and 18, respectively, to the eye piece 10. Preferably, mirror 22 is stabilized by a servo system including gyroscopes (not shown) to maintain the image of the target stabilized on the cross hairs of reticle 14. The use of gyroscopes in conjunction with a servo mechanism system to position a stabilization mirror is a standard technique and forms no part of the present invention.

The projector is employed to project a coded laser beam along the gunner's line of sight or deviated from the gunner's line of sight by some predetermined angular amount. The coding of the laser beam is occasioned by a pluraity of gray code reticles 29 disposed on a code disc 30 which is mounted on the shaft of a motor 32 for rotation thereby (see FIG. 3).

Typical code patterns for projecting into space an angle dependent code which when received is used to determine angular deviation from the projected beam are set forth in U.S. Pat. No. 3,662,180 for an "Angle Coding Navigation Beacon" and U.S. Pat. No. 3,799,675 for a "Direction Determining System", both patents assigned to the assignee of the present application and incorporated herein by reference. The angular disposition of the receiver relative to the beam axis is determined by the type, number and sequence of energy pulses recieved during a predetermined time interval.

The reticles mounted within the code disc 30 are illuminated by a radiation source 34. In the present embodiment radiation source 34 comprises a plurality of laser diode junctions (an array) and an integrator rod optically coupled thereto. The integrator rod scrambles the radiation from the plurality of laser diodes. However, its function may also be accomplished by defocusing of the image of the laser array. Alternate radiation sources can include any laser or even an incoherent radiation source. Actually any radiation wavelength which can be imaged could be used including microwave sources.

The radiation from the laser diode source 34 is caused to be directed to the reticles on the code disc 30 by a collimating lens 36, a pseudo-zoom lens 38 and a mirror 40. The radiation is reflected off mirror 40 passed through a relay lens system 42, reflected off another mirror 44 and imaged at a point 46 beyond the code disc 30. The point 46 is selected such that at missile launch rays from the relay lens 42 illuminate one entire reticle pattern 29 disposed on the code disc 30. In a typical embodiment each of the reticles disposed on the code disc 30 is 0.15 inches in diameter. For ease of explanation in FIG. 2 the reticle patterns are relayed by a lens 48 and mirror 50 to a point 52. After reflection from a mirror 56 a lens 54 then reimages the image from point 52 into space via mirror 22 to form the projected beam 58. In FIG. 1 a prism 50/56 actually provides the above function.

One of the primary features of the projector is to produce a beam of essentially constant linear diameter at the missile during its flight. Pseudo-zoom lens 38 aids in this function. In the present embodiment pseudo-zoom lens 38 has the capability of varying the image of the laser beam on gray code reticle from the largest size of the reticle, or in a typical embodiment, 0.15 inches to the smallest image of the laser diode or in a typical embodiment, 0.015 inches, or a 10 to 1 ratio. However, it is desired that the diameter of the beam be kept constant over a much larger range of approximately 80 to 1. This is accomplished by switching between two focal lengths of projector optics as will be described hereinafter.

As the missile increases in range from the projector, pseudo-zoom lens 36 is moved towards the laser diode source 34 such that the illuminated portion of the reticles on code disc 30 decreases. This, of course, increases the power density of the beam on the reticle of the code disc and maintains a constant effective beam diameter at the missile. Since the pseudo-zoom lens 36 is in the condenser path of the system and not in the critical imaging portion as in conventional zoom lens systems, the position of the psuedo-zoom does not affect boresight at all.

One typical pseudo-lens assembly is shown in FIG. 4 of the drawings. In this embodiment condenser lens 36 is fixedly mounted in a housing 31 having a ball bushing cage 33 arranged about the periphery thereof. The moveable zoom condenser lens 38 is mounted in a zoom housing 35 concentric with housing 31. Zoom housing 35 has a plurality of slots 37 therein which cooperate with a drive gear 39 for providing translation of the zoom housing 35 with respect to the fixed housing 31. Drive gear 39 is attached to the shaft 41 of a d.c. motor 43.

The position of zoom housing 35 is varied in a predetermined manner. The d.c. voltage applied to d.c. motor 43 is preprogrammed to vary in time so that lens displacement is proportional to the reciprocal of missile range. The voltage to motor 43 is supplied from a function or ramp generator (not shown). A position sensor 45 such as a potentiometer can be employed to feedback in conventional fashion information regarding the position of zoom housing 35 such that corrections, if required, can be made to the voltage supply to motor 43.

An alternate approach to the pseudo-zoom is to move both the source and condensing lenses (as single condensing lens) as a unit. Another alternative is to move only the source. However, in this arrangement there is a loss of collection efficiency.

As the missile gets further away from the launch site, for example, when it reaches a range of approximately 400 meters, the pseudo-zoom lens arrangement can no longer, by itself, insure constant effective beam diameter at the missile. Accordingly, a switching element 60, such as a rotary solenoid, which is coupled to mirror 40 is activated to rotate mirror 40 out of position about an axis 62. One embodiment of this is illustrated in FIG. 5 wherein mirror 40 is shown attached to the shaft of a rotary solenoid 60 for rotation thereby. When the voltage applied to motor 43 reaches a predetermined value indicative of a particular missile range, rotary solenoid 60 is activated to rotate mirror 40 out of the path of the beam from source 34. A pair of bearings 49 and 51 support the shaft of the solenoid 60.

When the mirror is so moved an image of the beam from pseudo-zoom is formed at a point 64 beyond code disc 30 such that the entire diameter of a reticle pattern is again illuminated although at this time the reticles are illuminated at the opposite side of the disc 30. The reticle patterns on the code disc 30 are arranged such that similar reticle patterns are on opposite sides of the disc except inverted in a right to left and up and down sense. Previously described lens 48 took out the inversion on the other side of disc 30. This lens, however, is not essential since a signal is transmitted to the missile which indicates that the short focus lens 54 is in use. The electronics of the missile may then be controlled to provide any necessary inversion.

Alternatively, separate paths illuminated by separate radiation sources may be employed.

The illuminated reticle pattern at point 64 is transmitted through a boresight tilt plate 66 to a mirror 68. The boresight tilt plate 66 provides small angular corrections to the position of the beam. These corrections were not required on the other optical path since beam alignment was much less critical because of the one to eight focal length ratio of the two lenses. The image reflected off mirror 68 is applied through beam splitter 20 to mirror 26 and thence reflected off mirror 26, through lens 24, and reflected off mirror 28 to form beam 70.

Mirror 22 is less than one hundred percent reflective such that a small percentage of the energy in beam 70 passes through mirror 22 to a corner cube retroreflector 72 from which the rays are returned parallel to the incident rays. The returning rays from corner cube retroreflector 72 are returned through the partially transparent mirror 22 remaining parallel to the outgoing rays. These rays pass through the lens 24 where they are converged, reflect off the mirror 26, reflect off the beam splitter 20 and are transmitted through the beam splitter 18 to a pin hole aperture 74 on the prism 16. The pin hole aperture 74 is either etched on a surface of the prism 16 or etched on a piece of glass which is cemented or otherwise affixed to the prism 16.

At pin hole 74 the reticle patterns from the code disc 30 are imaged sequentially as the laser diode source 34 is pulsed. A detector 76 positioned to receive energy from pin hole aperture 74 and sensitive to radiation at the frequency of the laser diode source 34 collects the radiation passing through the pin hole aperture and outputs an electrical signal proportional to the radiation. This signal is the same as a receiver mounted on the missile would output when the missile is on boresight and when the laser beam and visual beam are exactly aligned. Any misalignment between laser and visual line of sight will result in reticle patterns not being centered on the pin hole aperture 74.

The output of detector 76 which "reads" the reticle patterns is applied to a decoder 78 which decodes the output of the detector 76 to indicate any misalignment of laser and visual line of sight or any off centering of the reticle patterns in the pin hole aperture. Detector decoder 78, accordingly, outputs two signals: an azimuth boresight error signal 80 and an elevation boresight error signal 82. The azimuth boresight error signal 80 is applied to a controlled delay circuit 84 which delays or advances a laser pulse 86 which in combination with the rotating of code disc 30 causes the azimuth position of the transmitted beam to shift.

Decoder 78 also provides an output 98 which indicates if any error signal exists and if proper signals are being transmitted.

The elevation boresight error signal 82 is applied to a servo-drive circuit 88 which rotates the boresight tilt plate 66 via motor 67 to cause shifting of the beam (see FIG. 6). The tilt plate is mounted on a shaft 69 which is disposed in bearings 71. It should be noted that both elevation and azimuth errors can be corrected by separate tilt plates like tilt plate 66 or by repositioning of mirror 68.

A light source 90 is positioned proximate to code disc 30 to form images in conjunction with microscope and condenser projector 31 of timing marks carried by code disc 30 on a knife edge reticle 92, which is detected by a detector 94. This provides synchronization such that the laser source 34 will pulse when the reticle patterns of code disc 30 are exactly on bore-sight. The output of detector 94 is applied to controlled delay circuit 84 via a logic circuit 94.

Although visual aiming of the coded beam is described, in an alternative embodiment a tracker, such as an infrared tracker, television tracker etc., may be used instead. Thus, it is to be understood that the embodiments shown are illustrative only, and that many variations and modifications may be made without departing from the principles of the invention herein disclosed and defined by the appended claims.

We claim:

1. A beam projector, comprising:
   a source of radiation;
   a plurality of separate coded reticles arranged on a disc adapted for rotation; and
   means for rotating said disc for sequentially moving said separate coded reticles in the path of the beam of said radiation source.

2. A beam projector as defined in claim 1, further including a pseudo-zoom assembly intermediate said source of radiation and said coded reticles.

3. A beam projector as defined in claim 2, wherein said pseudo-zoom assembly includes at least a condenser lens intermediate said radiation source and said coded reticles.

4. A beam projector as defined in claim 3, wherein said pseudo-zoom assembly includes means for moving said condenser lens with respect to said radiation source.

5. A beam projector as defined in claim 3, wherein said pseudo-zoom assembly includes means for moving said radiation source and said lenses.

6. A beam projector as defined in claim 3, wherein said pseudo-zoom assembly includes a collimating lens intermediate said radiation source and said condenser lens.

7. A beam projector as defined in claim 6, wherein said collimating lens is fixed and further including means for moving said condenser lens with respect to said collimating lens.

8. A beam projector as defined in claim 7, wherein said collimating lens is axially aligned with respect to said moveable condenser lens.

9. A beam projector as defined in claim 8, wherein said moving means includes an electrical motor.

10. A beam projector as defined in claim 9, wherein said pseudo-zoom lens assembly further includes a first housing in which said collimating lens is disposed and a second housing concentric with said first housing in which said moveable condenser lens is disposed.

11. A beam projector as defined in claim 9, wherein said second housing has a plurality of slots therein; further including a gear coupled to said motor and disposed in said slots.

12. A beam projector as defined in claim 2, further including:
   a mirror disposed intermediate said pseudo-zoom lens assembly and said coded reticles; and
   means for moving said mirror out of the path of said radiation source thereby providing a different optical path between said pseudo-zoom lens assembly and said coded reticles such that the focal length of the projector is thereby altered.

13. A beam projector as defined in claim 12, wherein said moving means includes a rotary solenoid coupled to said mirror and means for activating said rotary solenoid.

14. A beam projector as defined in claim 2, wherein said psuedo-zoom assembly includes means for changing the area of said separate coded reticles illuminated by said source of radiation without continually focusing said source of radiation on said separate coded reticles.

15. A beam projector as defined in claim 1, further including means for aiming the projector.

16. A beam projector as defined in claim 15, wherein said aiming means includes:
   an eye piece; and
   means for projecting radiation received from outside said projector to said eye piece including said objective lens.

17. In a projector including a radiation source, a condensing section and an imaging section, the improvement comprising a pseudo-zoom assembly disposed in said condensing section for maintaining the numerical aperature at the imaging section essentially constant during zoom.

18. Apparatus as defined in claim 17, wherein said pseudo-zoom assembly includes a fixed collimating lens and a moveable condenser lens axially aligned with respect to said fixed collimating lens and moveable with respect thereto.

19. Apparatus as defined in claim 17, wherein said pseudo-zoom assembly includes a collimating lens, a condenser lens and means for simultaneously moving said lenses and said radiation source.

20. A beam projector, comprising:
   a source of radiation;
   a plurality of separate coded reticles;
   means for sequentially moving said separate coded reticles in the path of the beam of said radiation source;
   a pseudo-zoom assembly intermediate said source of radiation and said coded reticles;
   a mirror disposed intermediate said pseudo-zoom lens assembly and said coded reticles; and
   means for moving said mirror out of the path of said radiation source thereby providing a different optical path between said pseudo-zoom lens assembly and said coded reticles such that the focal length of the projector is thereby altered.

21. A beam projector as defined in claim 20, further including a relay lens intermediate said mirror and said coded reticles.

22. A beam projector, comprising:
   a source of radiation;
   a plurality of separate coded reticles;
   means for sequentially moving said separate coded reticles in the path of the beam of said radiation source;
   an objective lens;
   means for aiming the projector;
   an eye piece; and
   means for projecting radiation received from outside said projector to said eye piece including said objective lens.

23. A beam projector as defined in claim 22, further including:
   a boresight tilt plate disposed intermediate said coded reticles and said objective lens; and
   means for tilting said tilt plate.

24. A beam projector as defined in claim 23, further including:
   means for ascertaining any elevation boresight misalignment between a beam emitted from the projector due to said radiation source and a visual beam through said eye piece; and
   means for tilting said tilt plate an amount proportional to said elevation boresight misalignment.

25. A beam projector as defined in claim 22, wherein said source of radiation includes a pulsed laser and further including means for moving said coded reticles past said pulsed laser.

26. A beam projector as defined in claim 25, further including means for ascertaining any azimuth boresight misalignment between a beam emitted from the projector due to said radiation source and a visual beam through said eye piece; and
   means for charging the timing of said pulsed laser an amount proportional to said azimuth boresight misalignment.

27. A beam projector as defined in claim 25, further including means for ascertaining if the laser is pulsing at the time when a reticle is on boresight; and
   means for changing the timing of said pulsed laser an amount proportional to any ascertained asynchronism.

28. A beam projector, comprising:
   a source of radiation;
   a plurality of separate coded reticles in the path of the beam of said radiation source; and,
   means for changing the path by which the beam from the source of radiation exits the projector such that the focal length of the projector is thereby altered.

29. A beam projector as defined in claim 28, wherein said changing means includes a reflecting surface intermediate said source of radiation and said coded reticles and means for changing the position of said reflecting surface such that in one position it intercepts the beam and in the second position it is out of the path of the beam.

30. A beam projector, comprising:
   a source of radiation;
   an objective lens;
   an object to be illuminated intermediate said source of radiation and said objective lens; and
   means intermediate said source and said object to be illuminated to vary the irradiance on the illuminated object and the diameter of the area thus illuminated while maintaining the numerical aperture of the illumination filling the objective lens substantially constant.

31. A beam projector as defined in claim 30, wherein said varying means includes:
   a movable condenser lens intermediate said source of radiation and said object to be illuminated; and
   a fixed collimating lens intermediate said source of radiation and said movable condenser lens.

32. A beam projector as defined in claim 30, wherein said varying means includes:
   a condenser lens intermediate said source of radiation and said object to be illuminated;
   a collimating lens intermediate said source of radiation and said condenser lens; and
   means for moving said source, said condenser lens and said collimating lens together.

33. A beam projector as defined in claim 30, wherein said varying means includes
   a condenser lens intermediate said source of radiation and said object to be illuminated;
   a collimating lens intermediate said source of radiation and said condenser lens; and
   means for moving said source of radiation with respect to said lenses.

* * * * *